United States Patent
Radulescu et al.

(10) Patent No.: US 9,499,011 B2
(45) Date of Patent: *Nov. 22, 2016

(54) TIRE FOR HEAVY VEHICLES

(75) Inventors: Robert Radulescu, Simpsonville, SC (US); Guy Cluzel, Beaumont (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 2004 days.

This patent is subject to a terminal disclaimer.

(21) Appl. No.: 11/326,205

(22) Filed: Jan. 5, 2006

(65) Prior Publication Data

US 2006/0169381 A1    Aug. 3, 2006

Related U.S. Application Data

(63) Continuation of application No. PCT/EP2004/007982, filed on Jul. 16, 2004.

(30) Foreign Application Priority Data

Jul. 18, 2003   (FR) ...................... 03 08845

(51) Int. Cl.
*B60C 9/22* (2006.01)
*B60C 11/01* (2006.01)
(Continued)

(52) U.S. Cl.
CPC ............ *B60C 11/01* (2013.01); *B60C 9/2006* (2013.04); *B60C 9/28* (2013.01); *B60C 9/22* (2013.01);
(Continued)

(58) Field of Classification Search
CPC ................ B60C 9/2006; B60C 11/01; B60C 2011/033; B60C 9/28; B60C 9/22; B60C 2009/2261; B60C 2009/229; B60C 2011/0033

USPC ............................................. 152/209.1, 526
See application file for complete search history.

(56) References Cited

U.S. PATENT DOCUMENTS 3,939,890 A * 2/1976 Abe ..................... 152/209.14
4,688,615 A * 8/1987 Lee ............................ 152/531
(Continued)

FOREIGN PATENT DOCUMENTS

EP    0 582 196 A1    2/1994
FR    1 389 428          7/1963
(Continued)

OTHER PUBLICATIONS

Translation for Japan 63-180506 (no date).*
(Continued)

*Primary Examiner* — Steven D Maki
(74) *Attorney, Agent, or Firm* — Cozen O'Connor (57) ABSTRACT

The invention relates to a tire, the aspect ratio H/S of which is strictly greater than 0.55, having a radial carcass reinforcement comprising a crown reinforcement formed of at least two working crown layers of inextensible reinforcement elements, crossed from one ply to the other forming angles of between 10° and 45° with the circumferential direction, which itself is topped radially by a tread, said tread being joined to two beads by means of two sidewalls and the crown reinforcement comprising at least one layer of circumferential reinforcement elements.
According to the invention, the ratio of the thickness of the crown block at one shoulder end to the thickness of the crown block in the circumferential median plane is less than 1.20 and the ratio of the axial width of at least one layer of circumferential reinforcement elements to the axial width of the tread is greater than 0.5 and preferably greater than 0.6.

33 Claims, 5 Drawing Sheets

(51) Int. Cl.
    *B60C 9/20* (2006.01)
    *B60C 9/28* (2006.01)

(52) U.S. Cl.
    CPC .. *B60C 2009/229* (2013.04); *B60C 2009/2261* (2013.04); *B60C 2011/0033* (2013.04); *B60C 2200/06* (2013.04)

(56) References Cited

U.S. PATENT DOCUMENTS

| | | | |
|---|---|---|---|
| 5,180,453 A * | 1/1993 | Fukasawa et al. | 152/209.13 |
| 5,458,173 A | 10/1995 | Yamashita | |
| 5,622,575 A | 4/1997 | Hartmann et al. | |
| 5,660,656 A | 8/1997 | Herbelleau et al. | |
| 5,738,740 A * | 4/1998 | Cluzel | 152/527 |
| 6,367,527 B1 | 4/2002 | Cluzel | |
| 6,386,256 B1 * | 5/2002 | Colom | 152/526 |
| 6,401,778 B1 * | 6/2002 | Cluzel | 152/526 |
| 6,708,747 B1 * | 3/2004 | Tsuruta et al. | 152/526 |
| 9,102,202 B2 * | 8/2015 | Radulescu | B60C 9/2006 |

FOREIGN PATENT DOCUMENTS

| | | |
|---|---|---|
| FR | 2 222 232 | 10/1974 |
| FR | 2 728 510 | 6/1996 |
| JP | 62 152902 A | 7/1987 |
| JP | 63-180506 A * | 7/1988 |
| JP | 06-115311 * | 4/1994 |
| JP | 06-143922 A * | 5/1994 |
| WO | WO 99/24269 | 10/1998 |
| WO | WO 98/58810 * | 12/1998 |

OTHER PUBLICATIONS

Blow, Rubber Technology and Manufacture, 1971, pp. 349-356.*
Blow, Rubber Technology and Manufacture, pp. 349-356,, 1971.*
Machine translation for Japan 06-143922 (no date).*

* cited by examiner

TIRE FOR HEAVY VEHICLES

This application is a U.S. Continuation Application of International Application PCT/EP2004/007982 filed Jul. 16, 2004.

The present invention relates to a tire, the aspect ratio H/S of which is strictly greater than 0.55, having a radial carcass reinforcement, and more particularly to a tire intended to be fitted on vehicles bearing heavy loads and traveling at sustained speed, such as, for example, lorries, tractors, trailers or highway buses.

The reinforcement armature or reinforcement of the tires and in particular of the tires of vehicles of the heavy-vehicle type is currently—and most frequently—formed by stacking one or more plies conventionally referred to as "carcass plies", "crown plies", etc. This manner of designating the reinforcement armatures is derived from the manufacturing process, which consists of producing a series of semi-finished products in the form of plies, provided with cord reinforcing threads which are frequently longitudinal, which plies are then assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, to obtain a product ready to be vulcanized.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, in this type of process, a portion of all the plies constituting the carcass reinforcement (or only a part thereof) is turned up around a bead wire arranged in the tire bead. In this manner, the carcass reinforcement is anchored in the bead.

The general adoption of this type of conventional process in the industry, despite the numerous different ways of producing the plies and assemblies, has led the person skilled in the art to use a vocabulary which reflects the process; hence the generally accepted terminology, comprising in particular the terms "plies", "carcass", "bead wire", "shaping" to designate the change from a flat profile to a toroidal profile, etc.

There are nowadays tires which do not, properly speaking, comprise "plies" or "bead wires" in accordance with the preceding definitions. For example, document EP 0 582 196 describes tires manufactured without the aid of semi-finished products in the form of plies. For example, the reinforcement elements of the different reinforcement structures are applied directly to the adjacent layers of rubber mixes, the whole being applied in successive layers to a toroidal core the form of which makes it possible to obtain directly a profile similar to the final profile of the tire being manufactured. Thus, in this case, there are no longer any "semi-finished products", nor "plies", nor "bead wires". The base products, such as the rubber mixes and the reinforcement elements in the form of cords or filaments, are applied directly to the core. As this core is of toroidal form, the blank no longer has to be shaped in order to change from a flat profile to a profile in the form of a torus.

Furthermore, the tires described in this document do not have the "conventional" upturn of the carcass ply around a bead wire. This type of anchoring is replaced by an arrangement in which circumferential cords are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixture comprising at the same time certain semi-finished products to produce certain architectural aspects (such as plies, bead wires, etc.), whereas others are produced from the direct application of mixes and/or reinforcement elements.

In the present document, in order to take into account recent technological developments both in the field of manufacture and in the design of products, the conventional terms such as "plies", "bead wires", etc., are advantageously replaced by neutral terms or terms which are independent of the type of process used. Thus, the term "carcass-type reinforcing thread" or "sidewall reinforcing thread" is valid as a designation for the reinforcement elements of a carcass ply in the conventional process, and the corresponding reinforcement elements, generally applied at the level of the sidewalls, of a tire produced in accordance with a process without semi-finished products. The term "anchoring zone", for its part, may equally well designate the "traditional" upturn of a carcass ply around a bead wire of a conventional process and the assembly formed by the circumferential reinforcement elements, the rubber mix and the adjacent sidewall reinforcement portions of a bottom zone produced with a process using application on a toroidal core.

Generally in tires of the heavy-vehicle type, the carcass reinforcement is anchored on either side in the zone of the bead and is radially surmounted by a crown reinforcement formed of at least two layers, superposed and formed of cords or cables which are parallel in each layer. It may also comprise a layer of metal wires or cables of low extensibility which form an angle of between 45° and 90° with the circumferential direction, this ply, referred to as a triangulation ply, being radially located between the carcass reinforcement and the first, so-called working, crown ply, which are formed of parallel cords or cables having angles at most equal to 45° in absolute value. The triangulation ply forms with at least said working ply a triangulated reinforcement, which undergoes little deformation under the different stresses to which it is subjected, the essential role of the triangulation ply being to take up the transverse compressive forces to which all the reinforcement elements in the zone of the crown of the tire are subjected.

The crown reinforcement comprises at least one working layer; when said crown reinforcement comprises at least two working layers, these are formed of inextensible metallic reinforcement elements, which are parallel to each other within each layer and are crossed from one layer to the next, forming angles of between 10° and 45° with the circumferential direction. Said working layers, which form the working reinforcement, may also be covered by at least one so-called protective layer, formed of advantageously metallic, extensible reinforcement elements, which are referred to as "elastic elements".

In the case of tires for "heavy vehicles", a single protective layer is usually present and its protective elements, in the majority of cases, are oriented in the same direction and at the same angle in absolute value as those of the reinforcement elements of the working layer which is radially outermost and therefore radially adjacent. In the case of construction-vehicle tires which are intended to travel on relatively bumpy roads, it is advantageous for two protective layers to be present, the reinforcement elements being crossed from one layer to the next and the reinforcement elements of the radially inner protective layer being crossed with the inextensible reinforcement elements of the radially outer working layer adjacent to said radially inner protective layer.

Cables are said to be inextensible when said cables have a relative elongation at most equal to 0.2% under a tensile force equal to 10% of the breaking load.

Cables are said to be elastic when said cables have a relative elongation at least equal to 4% under a tensile force equal to the breaking load.

The circumferential direction of the tire, or longitudinal direction, is the direction corresponding to the periphery of the tire and defined by the direction of rolling of the tire.

The transverse or axial direction of the tire is parallel to the axis of rotation of the tire.

The radial direction is a direction intersecting and perpendicular to the axis of rotation of the tire.

The axis of rotation of the tire is the axis around which it rotates in normal use.

A radial or meridian plane is a plane containing the axis of rotation of the tire.

The circumferential median plane, or equatorial plane, is a plane which is perpendicular to the axis of rotation of the tire and divides the tire into two halves.

Certain current tires, referred to as "highway" tires, the aspect ratio H/S of which is strictly greater than 0.55, are intended to travel at high speed and on increasingly long journeys, owing to the improvement in road networks and the growth in motorway networks throughout the world. All the conditions under which such a tire is required to travel without doubt make it possible to increase the number of kilometers traveled, the wear of the tire being less; on the other hand, the endurance of the latter, and in particular of the crown reinforcement, is impaired.

There are in fact stresses at the level of the crown reinforcement and more particularly shearing stresses between the crown layers, allied to a not insignificant increase in the operating temperature at the level of the ends of the axially shortest crown layer, the consequence of which is the appearance and propagation of cracks in the rubber at said ends. The same problem exists in the case of edges of two layers having reinforcement elements, said other layer not necessarily being radially adjacent to the first.

In order to improve the endurance of the crown reinforcement of the type of tire in question, solutions relating to the structure and quality of the layers and/or profiled elements of rubber mixes which are arranged between and/or around the ends of plies, and more particularly the ends of the axially shortest working ply, have already been provided.

French Patent 1 389 428, to improve the resistance to degradation of the rubber mixes located in the vicinity of the edges of the crown reinforcement, advocates the use, in combination with a tread of low hysteresis, of a rubber profiled element covering at least the sides and the marginal edges of the crown reinforcement and formed of a rubber mix of low hysteresis.

French Patent 2 222 232, in order to avoid separations between crown reinforcement plies, teaches coating the ends of the reinforcement with a pad of rubber, the Shore A hardness of which differs from that of the tread surmounting said reinforcement, and is greater than the Shore A hardness of the profiled element of rubber mix arranged between the edges of crown reinforcement plies and the carcass reinforcement.

French application FR 2 728 510 proposes arranging, on one hand between the carcass reinforcement and the crown reinforcement working ply, radially closest to the axis of rotation, an axially continuous ply, formed of inextensible metal cables forming with the circumferential direction an angle at least equal to 60°, and the axial width of which is at least equal to the axial width of the shortest working crown ply, and on the other hand between the two working crown plies an additional ply formed of metallic elements, which are oriented substantially parallel to the circumferential direction.

Prolonged travel under particularly harsh conditions of the tires thus constructed has shown that there are limits in terms of endurance of these tires.

In order to overcome such drawbacks and improve the endurance of the crown reinforcement of these tires, French application WO 99/24269 proposes, on either side of the equatorial plane and in the immediate axial extension of the additional ply of reinforcement elements which are substantially parallel to the circumferential direction, to couple, over a certain axial distance, the two working crown plies formed of reinforcement elements crossed from one ply to the next, then to decouple them by means of profiled elements of rubber mix at least over the remainder of the width common to said two working plies.

One aim of the invention is to provide tires for "heavy vehicles", the aspect ratio H/S of which is strictly greater than 0.55, the endurance performance of which is improved still further compared with conventional tires.

This object is achieved according to the invention by a tire, the aspect ratio H/S of which is strictly greater than 0.55, having a radial carcass reinforcement comprising a crown reinforcement formed of at least two working crown layers of inextensible reinforcement elements, crossed from one ply to the other forming angles of between 10° and 45° with the circumferential direction, which itself is topped radially by a tread, said tread being joined to two beads by means of two sidewalls, the crown reinforcement comprising at least one layer of circumferential reinforcement elements, the ratio of the thickness of the crown block at one shoulder end to the thickness of the crown block in the circumferential median plane being less than 1.20 and the ratio of the axial width of the layer of circumferential reinforcement elements to the axial width of the tread being greater than 0.5, preferably greater than 0.6, and more preferably still greater than 0.65.

Circumferential reinforcement elements are reinforcement elements which form with the circumferential direction angles within the range +2.5°, −2.5° around 0°.

The aspect ratio H/S is the ratio of the height H of the tire on its rim to the maximum axial width S of the tire, when the latter is mounted on its operating rim and inflated to its rated pressure. The height H is defined as the difference between the maximum radius of the tread and the minimum radius of the bead.

The layer of circumferential reinforcement elements according to the invention is advantageously a layer which is continuous over its entire axial width.

The different measurements of thickness are performed on a cross-section of a tire, the tire therefore being in a non-inflated state.

The axial widths of the layers of reinforcement elements are measured on a cross-section of a tire, the tire therefore being in a non-inflated state.

The axial width of the tread is measured between two shoulder ends when the tire is mounted on its operating rim and inflated to its rated pressure.

A shoulder end is defined, in the zone of the shoulder of the tire, by the projection orthogonal to the outer surface of the tire of the intersection of the tangents to the surfaces of an axially outer end of the tread (apex of the tread patterns) on one hand and of the radially outer end of a sidewall on the other hand.

The thickness of the crown block in the circumferential median plane is defined as being the distance in the radial direction between the tangent to the crown of the tread in the circumferential median plane and the tangent to the radially innermost rubber mix of the tire, in the circumferential median plane.

The thickness of the crown block at one shoulder end is defined by the length of the orthogonal projection of the shoulder end on the radially innermost layer of rubber mix of the tire.

The invention relates more particularly to a tire of the "heavy-vehicle" type, the ratio of the height on rim H to its maximum axial width S, or aspect ratio, of which is at most equal to 0.80 and which is intended to be fitted on a medium- or high-tonnage vehicle, such as a lorry, bus, trailer, etc.

The tire thus defined according to the invention makes it possible, for a given dimension and more specifically for a given aspect ratio, to improve the performances in terms of endurance of the tire.

Compared with a conventional tire of the same dimension, the tire according to the invention has thicknesses of the crown block which are substantially similar. It would appear that the thickness of the crown block in the circumferential median plane may in accordance with certain embodiments be greater than the thickness of the crown block at one shoulder end; the ratio of the thickness of the crown block at one shoulder end to the thickness of the crown block in the circumferential median plane is then advantageously greater than 0.50.

In terms of architecture of the reinforcement armature at the level of the crown block, that is to say beneath the tread, this results in reinforcement layers of the carcass reinforcement and reinforcement layers of the crown reinforcement the radii of axial (or meridian) curvature of which are virtually infinite at all points of the axial width of a zone of a width at least equal to 50% of the width of the tread and centered on the circumferential median plane.

Furthermore, the invention advantageously provides for a supplementary layer of rubber mix compared with a conventional tire. This supplementary layer of rubber mix is put in place directly beneath the tread so as to be centered on the circumferential median plane. The presence of such a layer makes it possible to obtain a radius of the axial curvature of the tread which is less than that of the axial curvature of the reinforcement layers of the carcass reinforcement and thus to obtain an imprint of the zone of contact on the ground of the tire which is in conformity with conventional, satisfactory imprints for the applications in question. This supplementary layer of rubber mix will also make it possible to impart protection against oxidation of the working plies.

The invention advantageously provides for at least one layer constituting the crown architecture to be present radially beneath the axially outermost "rib", or tread pattern of longitudinal main orientation. This embodiment makes it possible to reinforce the rigidity of said tread pattern.

According to a preferred embodiment of the invention, the ratio of the thickness of the crown block at one shoulder end to the thickness of the crown block in the circumferential median plane is less than 1.15 and more preferably still less than 1.10.

One more particularly advantageous embodiment of the invention provides for the ratio of the axial width of the tread to the maximum axial width of the tire to be greater than or equal to 0.80 and preferably greater than or equal to 0.82.

This advantageous embodiment of the invention results in particular in a better yield in terms of wear life.

According to a preferred embodiment of the invention, the difference between the axial width of the axially widest working crown layer and the axial width of the axially least wide working crown layer is between 10 and 30 mm.

More preferably still, the axially widest working crown layer is radially to the inside of the other working crown layers.

According to one particularly advantageous variant embodiment of the invention, the distance between the end of the axially widest working crown layer and the carcass reinforcement is between 2 and 15 mm, and preferably between 5 and 7 mm. This variant embodiment results in a curvature, more pronounced than is usual in this type of tire, of the reinforcement armature in the zones of the shoulders of the tire. The quantity of rubber material added between the carcass reinforcement and the end of the reinforcement armature is thus of lesser thickness than that usually introduced into this type of tire; such a characteristic is also beneficial to an improvement in endurance of the tire.

One advantageous embodiment of the invention provides for the axial width of at least one layer of circumferential reinforcement elements to be less than the axial width of the axially widest working crown layer.

Such a width of at least one layer of circumferential reinforcement elements permits in particular a reduction in the shearing stresses between the working layers and hence improves still further thereby the endurance performance of the tire.

According to one advantageous embodiment of the invention, the reinforcement elements of at least one layer of circumferential reinforcement elements are metallic reinforcement elements having a secant modulus at 0.7% elongation of between 10 and 120 GPa and a maximum tangent modulus of less than 150 GPa.

According to a preferred embodiment, the secant modulus of the reinforcement elements at 0.7% elongation is less than 100 GPa and greater than 20 GPa, preferably between 30 and 90 GPa and more preferably still less than 80 GPa.

Preferably also, the maximum tangent modulus of the reinforcement elements is less than 130 GPa and more preferably still less than 120 GPa.

The moduli expressed above are measured on a curve of tensile stress as a function of the elongation determined with a prestress of 20 MPa referred to the metal section of the reinforcement element, the tensile stress corresponding to a measured tension referred to the metal section of the reinforcement element.

The moduli of the same reinforcement elements may be measured on a curve of tensile stress as a function of the elongation determined with a prestress of 10 MPa referred to the overall section of the reinforcement element, the tensile stress corresponding to a measured tension referred to the overall section of the reinforcement element. The overall section of the reinforcement element is the section of a composite element formed of metal and of rubber, the latter having in particular penetrated the reinforcement element during the phase of curing the tire.

According to this formulation relative to the overall section of the reinforcement element, the reinforcement elements of at least one layer of circumferential reinforcement elements are metallic reinforcement elements having a secant modulus at 0.7% elongation of between 5 and 60 GPa and a maximum tangent modulus of less than 75 GPa.

According to a preferred embodiment, the secant modulus of the reinforcement elements at 0.7% elongation is less than 50 GPa and greater than 10 GPa, preferably between 15 and 45 GPa and more preferably still less than 40 GPa.

Preferably also, the maximum tangent modulus of the reinforcement elements is less than 65 GPa and more preferably still less than 60 GPa.

According to one preferred embodiment, the reinforcement elements of at least one layer of circumferential reinforcement elements are metallic reinforcement elements having a curve of tensile stress as a function of the relative elongation having shallow gradients for the low elongations and a substantially constant, steep gradient for the higher elongations. Such reinforcement elements of the additional ply are usually referred to as "bi-modular" elements.

According to a preferred embodiment of the invention, the substantially constant, steep gradient appears from a relative elongation of between 0.1% and 0.5% onwards.

The different characteristics of the reinforcement elements mentioned above are measured on reinforcement elements taken from tires.

Reinforcement elements which are more particularly suitable for producing at least one layer of circumferential reinforcement elements according to the invention are for example assemblies of formula 21.23, the construction of which is 3×(0.26+6×0.23) 4.4/6.6 SS; this stranded cable is formed of 21 elementary cords of formula 3×(1+6), with 3 strands twisted together each formed of 7 cords, one cord forming a central core of a diameter of 26/100 mm and 6 wound cords of a diameter of 23/100 mm. Such a cable has a secant modulus at 0.7% equal to 45 GPa and a maximum tangent modulus equal to 98 GPa, both measured on a curve of tensile stress as a function of the elongation determined with a prestress of 20 MPa referred to the metal section of the reinforcement element, the tensile stress corresponding to a measured tension referred to the metal section of the reinforcement element. On a curve of tensile stress as a function of the elongation determined with a prestress of 10 MPa referred to the overall section of the reinforcement element, the tensile stress corresponding to a measured tension referred to the overall section of the reinforcement element, this cable of formula 21.23 has a secant modulus at 0.7% of 23 GPa and a maximum tangent modulus of 49 GPa.

In the same manner, another example of reinforcement elements is an assembly of formula 21.28, the construction of which is 3×(0.32+6×0.28) 6.2/9.3 SS. This cable has a secant modulus at 0.7% of 56 GPa and a maximum tangent modulus of 102 GPa, both measured on a curve of tensile stress as a function of the elongation determined with a prestress of 20 MPa referred to the metal section of the reinforcement element, the tensile stress corresponding to a measured tension referred to the metal section of the reinforcement element. On a curve of tensile stress as a function of the elongation determined with a prestress of 10 MPa referred to the overall section of the reinforcement element, the tensile stress corresponding to a measured tension referred to the overall section of the reinforcement element, this cable of formula 21.28 has a secant modulus at 0.7% of 27 GPa and a maximum tangent modulus of 49 GPa.

The use of such reinforcement elements in at least one layer of circumferential reinforcement elements makes it possible in particular to retain satisfactory rigidities of the layer including after the stages of shaping and of curing in conventional manufacturing processes.

According to a second embodiment of the invention, the circumferential reinforcement elements may be formed of inextensible metallic elements cut so as to form sections of a length very less than the circumference of the least long layer, but preferably greater than 0.1 times said circumference, the cuts between sections being axially offset from each other. More preferably still, the modulus of elasticity in tension per unit of width of the additional layer is less than the modulus of elasticity in tension, measured under the same conditions, of the most extensible working crown layer. Such a embodiment makes it possible to impart to the layer of circumferential reinforcement elements, in simple manner, a modulus which can easily be adjusted (by selecting the intervals between sections of one and the same row), but which is in all cases lower than the modulus of the layer formed of the same metallic elements, which are however continuous, the modulus of the additional layer being measured on a vulcanized layer of cut elements, taken from the tire.

According to a third embodiment of the invention, the circumferential reinforcement elements are undulating metallic elements, the ratio $a/\lambda$ of the amplitude of undulation to the wavelength of which being at most equal to 0.09. Preferably, the modulus of elasticity in tension per unit of width of the additional layer is less than the modulus of elasticity in tension, measured under the same conditions, of the most extensible working crown layer.

The metallic elements are preferably steel cables.

According to one variant embodiment of the invention, at least one layer of circumferential reinforcement elements is arranged radially between two working crown layers.

According to the latter variant embodiment, the layer of circumferential reinforcement elements makes it possible to limit more significantly the compression of the reinforcement elements of the carcass reinforcement than a similar layer placed radially to the outside of the working layers. It is preferably radially separated from the carcass reinforcement by at least one working layer so as to limit the stresses on said reinforcement elements and not to fatigue them excessively.

More advantageously still in the case of a layer of circumferential reinforcement elements which is arranged radially between two working crown layers, the axial widths of the working crown layers radially adjacent to the layer of circumferential reinforcement elements are greater than the axial width of said layer of circumferential reinforcement elements and, preferably, said working crown layers adjacent to the layer of circumferential reinforcement elements, on either side of the equatorial plane and in the immediate axial extension of the layer of circumferential reinforcement elements, are coupled over an axial width, then being decoupled by profiled elements of rubber mix at least over the remainder of the width common to said two working layers.

The presence of such coupling between the working crown layers adjacent to the layer of circumferential reinforcement elements also permits the reduction in the tensile stresses acting on the axially outermost circumferential elements located closest to the coupling.

The thickness of the decoupling profiled elements between working plies, measured level with the ends of the least wide working ply, will be at least equal to two millimeters, and preferably greater than 2.5 mm.

"Coupled plies" are to be understood to mean plies, the respective reinforcement elements of which are separated radially by at most 1.5 mm, said thickness of rubber being measured radially between the upper and lower generatrices respectively of said reinforcement elements.

The invention also advantageously provides, in order to reduce the tensile stresses acting on the axially outermost circumferential elements, for the angle formed with the circumferential direction by the reinforcement elements of the working crown layers to be less than 30° and preferably less than 25°.

According to another advantageous variant of the invention, the working crown layers comprise reinforcement elements, crossed from one ply to the other, forming with the circumferential direction angles which are variable in the axial direction, said angles being greater on the axially outer edges of the layers of reinforcement elements compared with the angles of said elements measured at the level of the circumferential median plane. Such an embodiment of the invention makes it possible to increase the circumferential rigidity in some zones and on the contrary to reduce it in others, in particular in order to reduce the compression of the carcass reinforcement.

One preferred embodiment of the invention also provides for the crown reinforcement to be finished off radially to the outside by at least one additional layer, referred to as a protective layer, of what are called elastic reinforcement elements, which are oriented relative to the circumferential direction at an angle of between 10° and 45° and of the same direction as the angle formed by the inextensible elements of the working layer which is radially adjacent thereto.

The protective layer may have an axial width less than the axial width of the least wide working layer. Said protective layer may also have an axial width greater than the axial width of the least wide working layer, such that it covers the edges of the least wide working layer and, in the case of the radially upper layer as being the least wide, such that it is coupled, in the axial extension of the additional reinforcement, with the widest working crown layer over an axial width, then, axially to the outside, being decoupled from said widest working layer by profiled elements of a thickness at least equal to 2 mm. The protective layer formed of elastic reinforcement elements may, in the case mentioned above, be on one hand possibly decoupled from the edges of said least wide working layer by profiled elements of a thickness substantially less than the thickness of the profiled elements separating the edges of the two working layers, and have on the other hand an axial width less than or greater than the axial width of the widest crown layer.

According to any one of the embodiments of the invention mentioned previously, the crown reinforcement may also be finished off, radially to the inside between the carcass reinforcement and the radially inner working layer closest to said carcass reinforcement, by a triangulation layer of inextensible metallic reinforcement elements made of steel forming, with the circumferential direction, an angle greater than 60° and of the same direction as that of the angle formed by the reinforcement elements of the layer radially closest to the carcass reinforcement.

Other advantageous details and characteristics of the invention will become apparent hereafter from the description of the examples of embodiment of the invention with reference to FIGS. 1 to 5, which represent.

The figures are not shown to scale in order to simplify understanding thereof. The figures show only a half-view of a tire which is extended symmetrically relative to the axis XX' which represents the circumferential median plane, or equatorial plane, of a tire.

Figure 1:
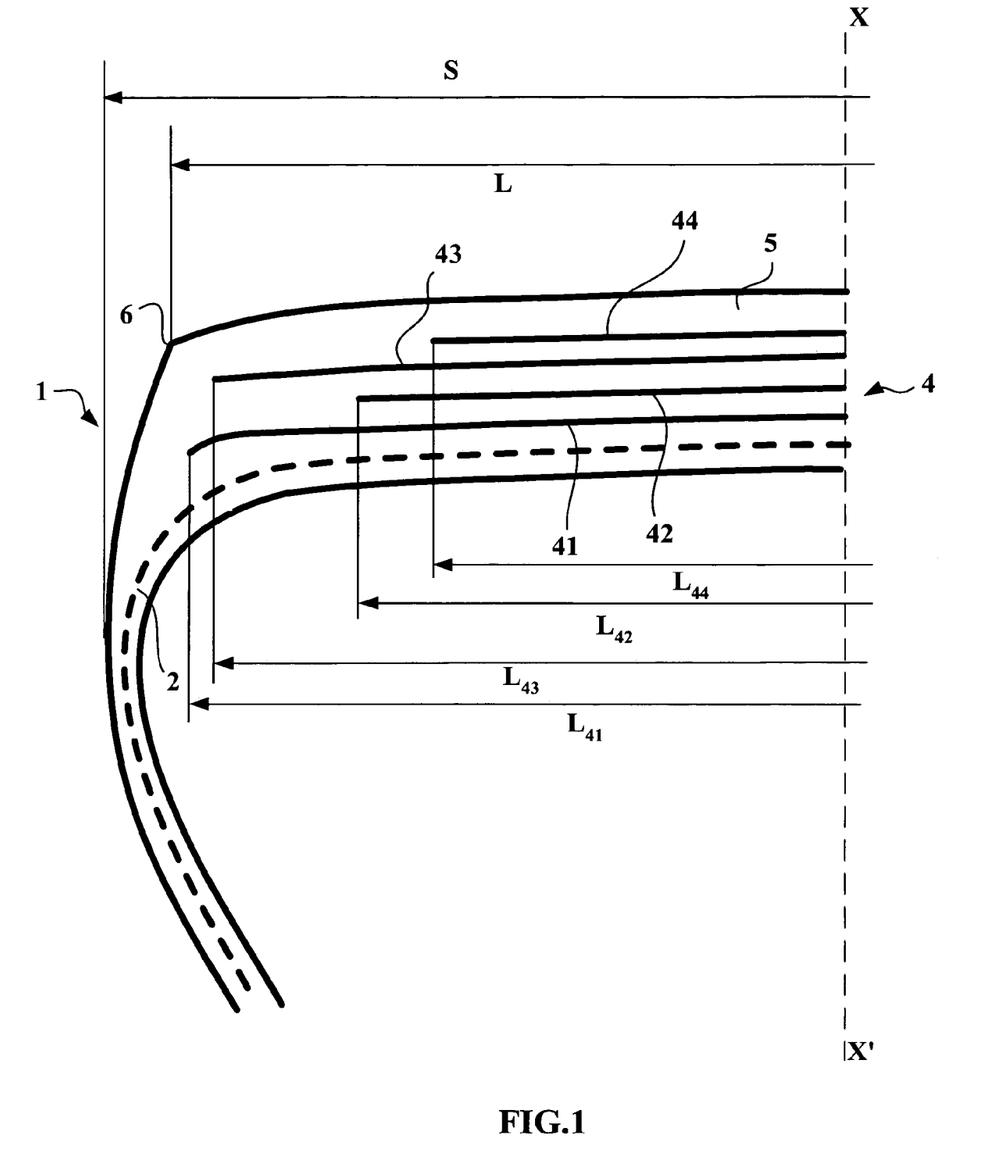
FIG. 1: a meridian view of a diagram of a tire according to one embodiment of the invention.

In FIG. 1, the tire 1, of dimension 295/60 R 22.5X, has a form ratio H/S of 0.60, H being the height of the tire 1 on its mounting rim and S its maximum axial width. Said tire 1 comprises a radial carcass reinforcement 2 anchored in two beads, not shown in the figure. The carcass reinforcement is formed of a single layer of metal cables. This carcass reinforcement 2 is wrapped by a crown reinforcement 4, formed radially from the inside to the outside:

of a first working layer 41 formed of non-wrapped, inextensible metal 11.35 cables, which are continuous over the entire width of the ply, and oriented at an angle of 18°, of a layer of circumferential reinforcement elements 42 which is formed of metal 21×28 cables made of steel, of "bi-modular" type, of a second working layer 43 formed of non-wrapped, inextensible metal 11.35 cables, which are continuous over the entire width of the ply, and oriented at an angle of 18° and crossed at the metal cables of the layer 41, of a protective layer 44 formed of elastic metal 18×23 cables.

The crown reinforcement is itself topped by a tread 5.

The measurements of thickness of the crown block at each of the shoulder ends 6 and in the circumferential median plane XX' are equal to 31.8 mm at the shoulder ends and 30.1 mm in the circumferential median plane. The ratio of the thickness of the crown block at one shoulder end to the thickness of the crown block in the circumferential median plane is equal to 1.06 and therefore less than 1.15 in accordance with the invention.

Furthermore, the axial width of the tread L is equal to 262 mm and the ratio of said axial width of the tread L to the maximum axial width S of the tire is equal to approximately 0.89 and therefore greater than 0.80.

The axial width $L_{41}$ of the first working layer 41 is equal to 248 mm, which, for a tire of conventional shape, is substantially less than the width L of the tread, which is equal, in the case in question, to 262 mm. The difference between the width of the tread and the width $L_{41}$ is therefore equal to 14 mm and consequently less than 15 mm in accordance with the invention.

The axial width $L_{43}$ of the second working layer 43 is equal to 230 mm. The difference between the widths $L_{41}$ and $L_{43}$ is equal to 18 and consequently of between 10 and 30 mm in accordance with the invention.

As for the overall axial width $L_{42}$ of the layer of circumferential reinforcement elements 42, it is equal to 188 mm. The ratio of the width $L_{42}$ to the width of the tread is equal to 0.71 and therefore far greater than 0.5.

The last crown ply 44, referred to as "protective ply", has a width $L_{44}$ equal to 188 mm.

In accordance with the invention, over the entire width of the layer of reinforcement elements 42, all the layers of the crown reinforcement have a virtually infinite radius of curvature. The circumferentially oriented reinforcement elements in this configuration are less sensitive to the risks of breaking in particular at the axially outer ends.

Beyond the axially outer ends of the layer of circumferential reinforcement elements, the working layers have a curvature such that the distance between the axially outer end of the widest working layer 41 and the carcass reinforcement is approximately 5 mm.

Figure 2:
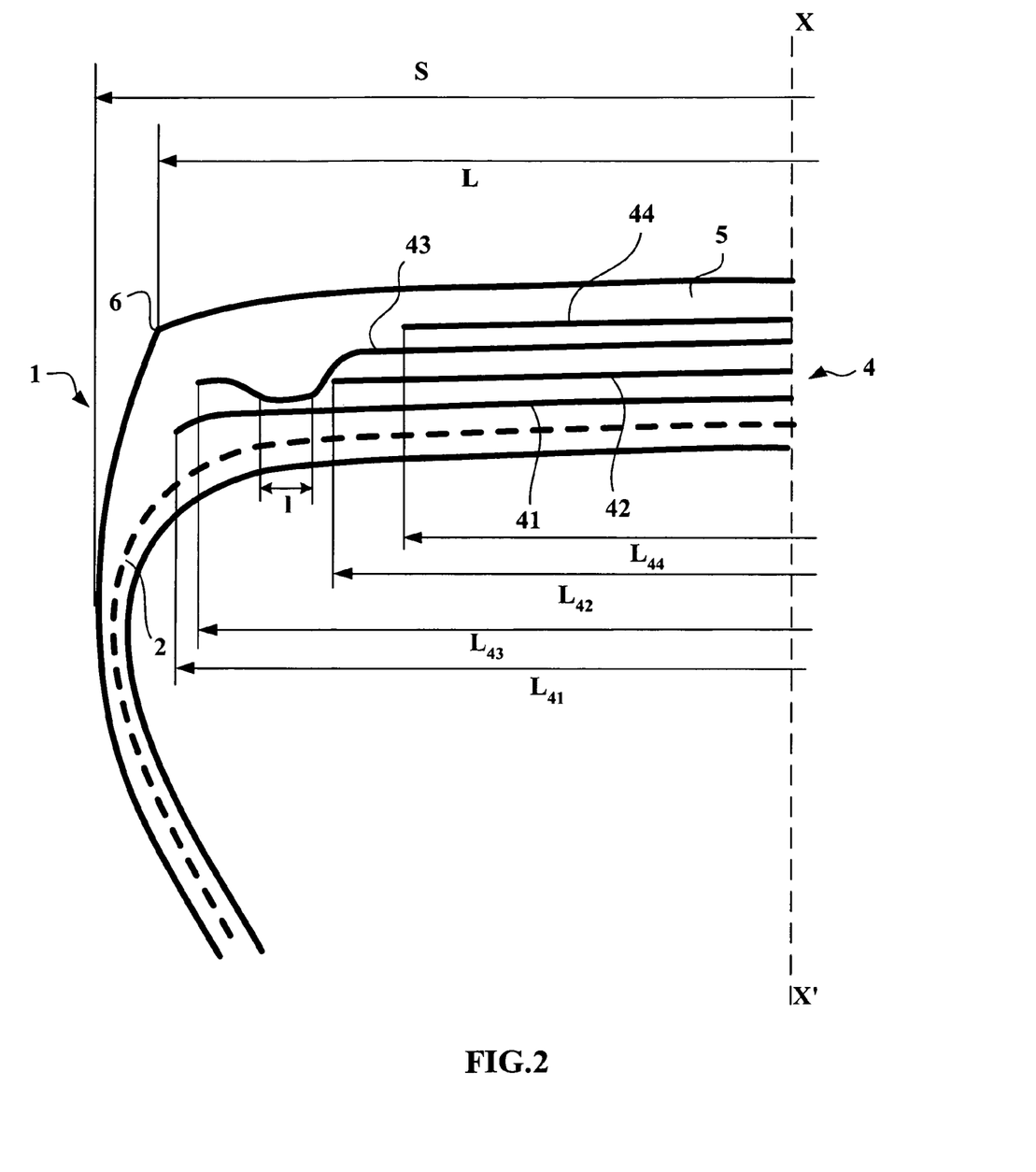
FIG. 2: a meridian view of a diagram of a tire according to a second embodiment of the invention.

In FIG. 2, the tire 1 differs from that shown in FIG. 1 in that the two working layers 41 and 43, on either side of the equatorial plane and axially in the extension of the layer of circumferential reinforcement elements 42, are coupled over an axial width 1: the cables of the first working layer 41 and the cables of the second working layer 43, over the axial width of coupling 1 of the two layers, are separated radially from each other by a layer of rubber, the thickness of which is minimal and corresponds to twice the thickness of the rubber calendering layer of the wrapped metal 27.23 cables of which each working layer 41, 43 is formed, namely 0.8 mm. Over the remaining width common to the two working layers, the two working layers 41, 43 are separated by a rubber profiled element, not shown in the figure, the thickness of said profiled element increasing from the axial end of the coupling zone to the end of the least wide working layer. Said profiled element advantageously has a width sufficient to cover radially the end of the widest working layer 41, which is in this case the working layer radially closest to the carcass reinforcement.

Figure 3:
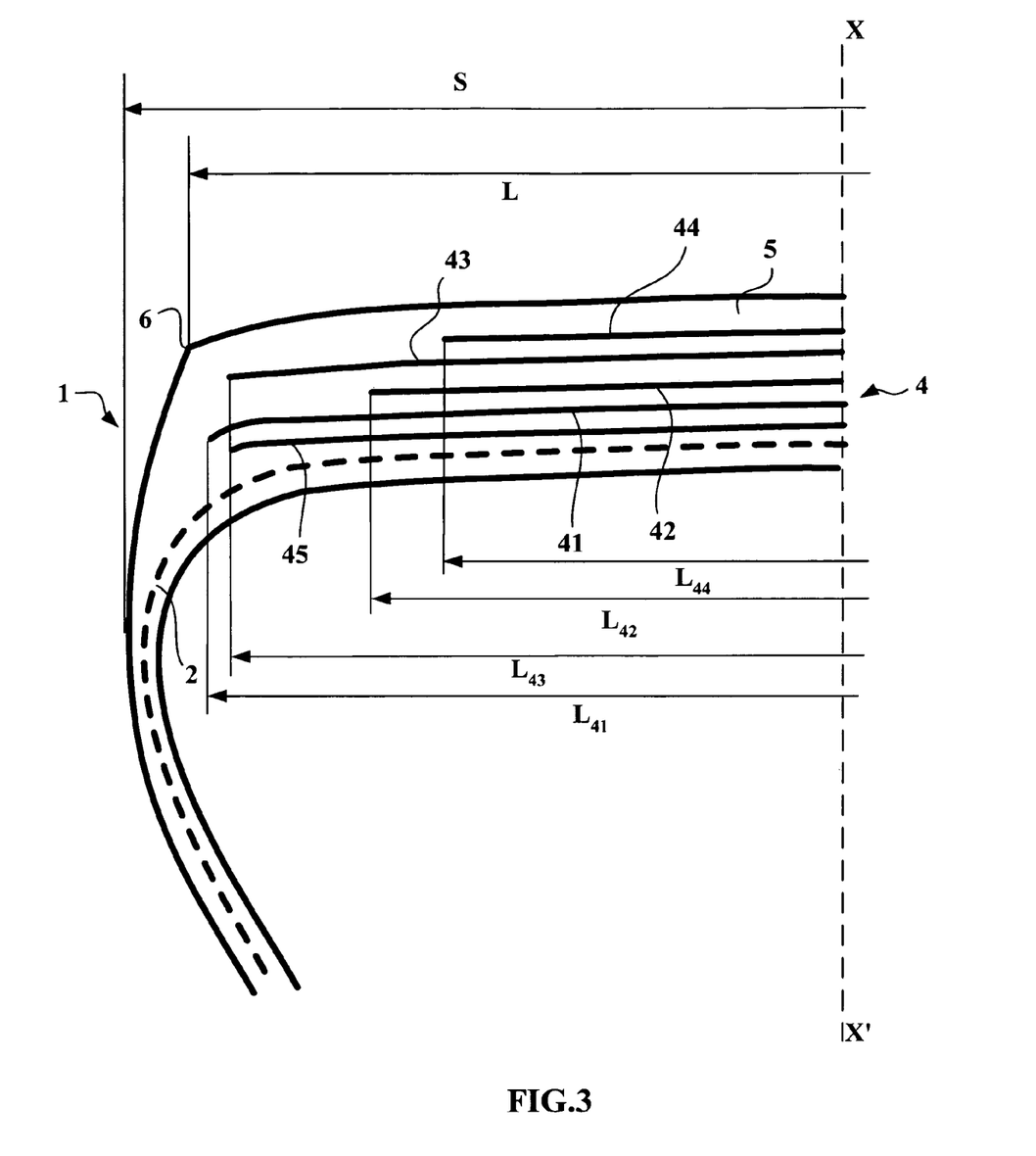
FIG. 3: a meridian view of a diagram of a tire according to a third embodiment of the invention.

In FIG. 3, the tire 1 differs from that shown in FIG. 1 in that it comprises a supplementary layer of reinforcement elements 45, referred to as a triangulation layer, of a width substantially equal to that of the working layer 43. The reinforcement elements of this layer 45 form an angle of approximately 60° with the circumferential direction and are oriented in the same direction as the reinforcement elements of the working layer 41. This layer 41 makes it possible in particular to contribute to taking up the transverse compressive stresses to which all the reinforcement elements in the zone of the crown of the tire are subject.

Figure 4:
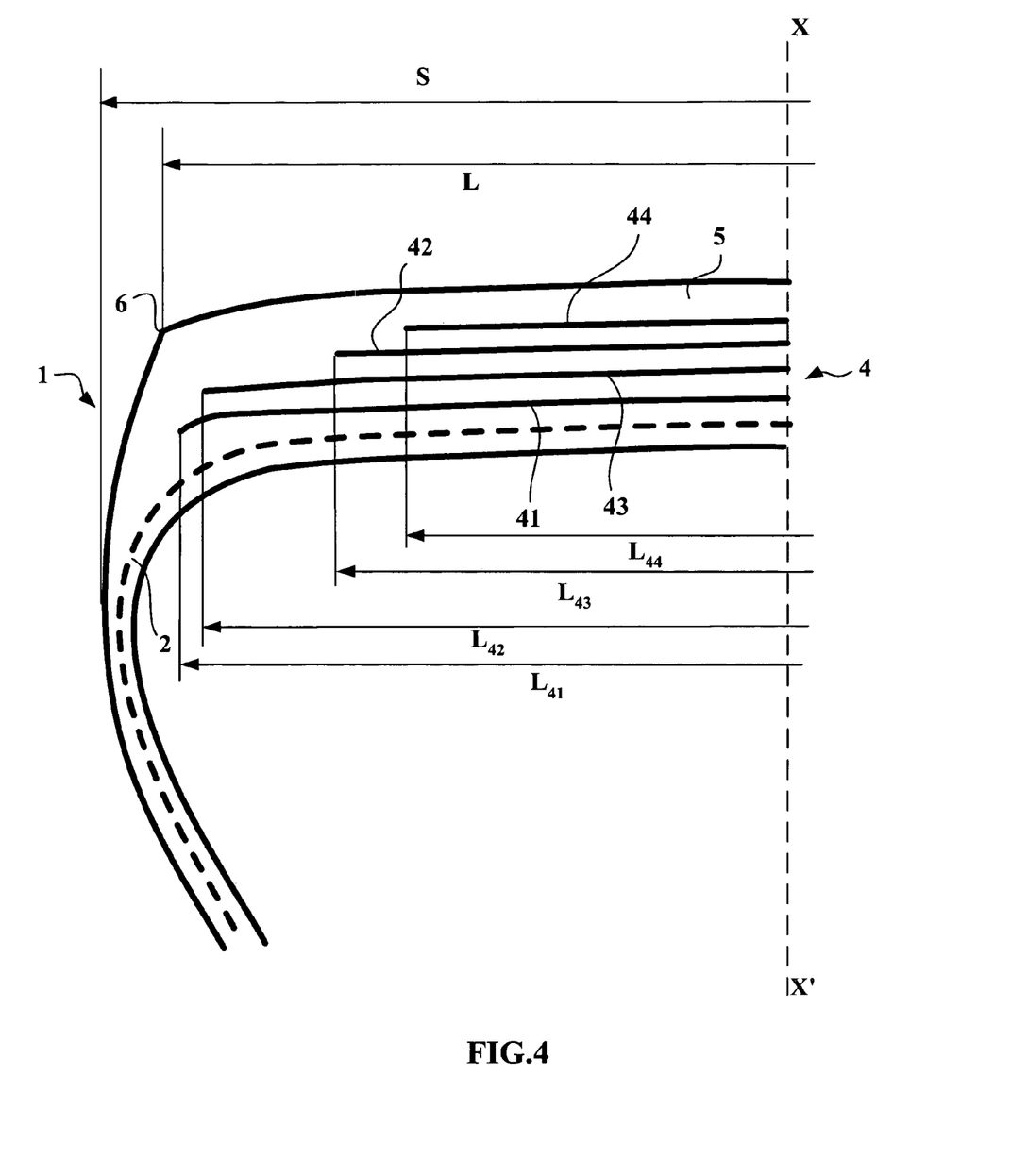
FIG. 4: a meridian view of a diagram of a tire according to a fourth embodiment of the invention.

In FIG. 4, the tire 1 differs from that shown in FIG. 1 in that the layer of circumferential reinforcement elements is radially external to the working layers 41 and 43 and therefore radially adjacent to the axially narrowest working layer 43.

Figure 5:
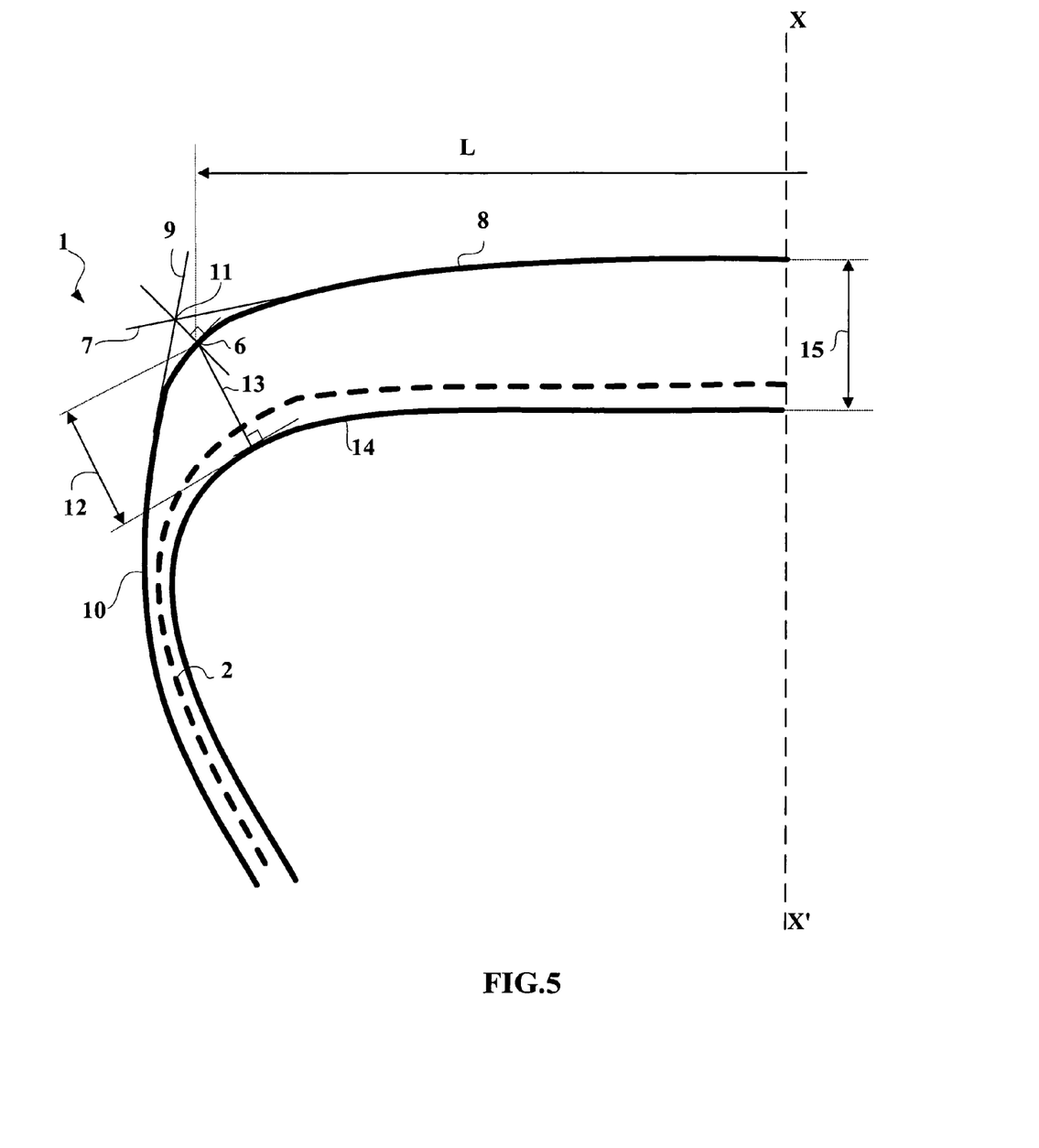
FIG. 5: a meridian view of a diagram of a tire illustrating the determination of a shoulder end.

FIG. 5 represents a meridian view of a diagram of a tire 1 on which a first tangent 7 to the surface of an axially outer end of the tread 8 is drawn; the surface of the tread is defined by the radially outer surface or crown of the tread patterns, which are not shown in the figures. A second tangent 9 to the surface of the radially outer end of a sidewall 10 intersects the first tangent 7 at a point 11. The projection orthogonal to the outer surface of the tire defines the shoulder end 6.

The axial width L of the tread is thus measured between the two shoulder ends 6.

FIG. 5 also indicates the measurement of the thickness of the crown block at one shoulder end 6, defined by the length 12 of the orthogonal projection 13 of the shoulder end 6 on the radially innermost layer of rubber mix 14 of the tire.

FIG. 5 also shows the measurement of the thickness of the crown block in the circumferential median plane XX', defined as being the distance 15 in the radial direction between the tangent to the crown of the tread 8 in the circumferential median plane and the tangent to the radially innermost rubber mix 14 of the tire, in the circumferential median plane.

Tests were carried out with the tire produced according to the invention in accordance with the representation of FIG. 1 and compared with a reference tire which is identical but produced using a conventional configuration.

This conventional tire in particular does not comprise an intermediate layer of circumferential reinforcement elements between the working crown layers the reinforcement elements of which are oriented by an angle equal to 18° and the tread of which has a width equal to 262 mm.

The first endurance tests were carried out by fitting identical vehicles with each of the tires and making each of the vehicles follow straight-line paths, the tires being subjected to loads greater than the rated load in order to speed up this type of test.

The reference vehicle comprising the conventional tires is associated with a load per tire of 3600 kg at the start of travel and changes to reach a load of 4350 kg at the end of travel.

The vehicle comprising the tires according to the invention is associated with a load per tire of 3800 kg at the start of travel and changes to reach a load of 4800 kg at the end of travel.

The tests thus carried out showed that the vehicle fitted with tires according to the invention covered a distance greater by 46% than the distance covered by the reference vehicles. It would therefore appear that the tires according to the invention are of distinctly higher performance than the reference tires even if they are subjected to higher load stresses.

Other endurance tests were carried out on a test machine which imposes a load on the tires and a drift angle. The tests were carried out for the tires according to the invention with a load greater by 6% and a drift angle greater by 10% than those applied to the reference tires.

The results obtained show gains in terms of distance covered by the tires according to the invention greater than 40% compared with the distance covered by the reference tires.

The invention claimed is:

1. A tire configured for at least one of a truck and a bus having an aspect ratio H/S strictly greater than 0.55 and less than 0.75, said tire having a radial carcass reinforcement comprising a crown reinforcement formed of at least two working crown layers of inextensible reinforcement elements, crossed from one ply to another forming angles of between 10 and 45 with a circumferential direction, said crown reinforcement being topped radially by a tread, said tread being joined to two beads by means of two sidewalls, the crown reinforcement comprising at least one layer of circumferential reinforcement elements,
  wherein the ratio of a thickness of a crown block at one shoulder end to a thickness of the crown block in a circumferential median plane is less than 1.20 and greater than 1;
  wherein the thickness of a crown block at one shoulder end is defined by a length of an orthogonal projection of the shoulder end on a radially innermost layer of rubber mix of the tire from the shoulder end on the outer surface of the tire to the radially innermost layer of rubber mix; and
  wherein the shoulder end is defined, in a zone of the shoulder of the tire, by the orthogonal projection orthogonal to an outer surface of the tire of an intersection of tangents to surfaces of an axially outer end of the tread and of a radially outer end of a sidewall,
  wherein the ratio of the axial width of the at least one layer of circumferential reinforcement elements to the axial width of the tread is greater than 0.65,
  wherein a ratio of the axial width of the tread to a maximum axial width of the tire is greater than or equal to 0.80.

2. The tire according to claim 1, wherein the ratio of the thickness of the crown block at one shoulder end to the thickness of the crown block in the circumferential median plane is less than 1.15.

3. The tire according to claim 1, wherein the at least one layer of circumferential reinforcement elements is continuous over its entire axial width.

4. The tire according to claim 1, wherein an axially widest working crown layer is radially to an inside of at least one of the at least two working crown layers.

5. The tire according to claim 1, wherein a difference between an axial width of an axially widest working crown layer of the at least two working crown layers and an axial width of an axially least wide working crown layer of the at least two working crown layers is between 10 and 30 mm.

6. The tire according to claim 1, wherein a distance between an end of an axially widest working crown layer of the at least two working crown layers and the carcass reinforcement is between 2 and 15 mm.

7. The tire according to claim 1, wherein the axial width of the at least one layer of circumferential reinforcement elements is less than an axial width of an axially widest working crown layer of the at least two working crown layers.

8. The tire according to claim 1, wherein the at least one layer of circumferential reinforcement elements is arranged radially between the at least two working crown layers.

9. The tire according to claim 8, wherein axial widths of the working crown layers radially adjacent to the layer of circumferential reinforcement elements are greater than an axial width of said layer of circumferential reinforcement elements.

10. The tire according to claim 9, wherein the working crown layers adjacent to the layer of circumferential reinforcement elements, on either side of an equatorial plane and in an immediate axial extension of the layer of circumferential reinforcement elements, are coupled over an axial width, then being decoupled by profiled elements of rubber mix at least over the remainder of a width common to said two working crown layers.

11. The tire according to claim 1, wherein the reinforcement elements of the at least one layer of circumferential reinforcement elements are metallic reinforcement elements having a secant modulus at 0.7% elongation of between 10 and 120 GPa and a maximum tangent modulus of less than 150 GPa.

12. The tire according to claim 11, wherein the secant modulus of the reinforcement elements at 0.7% elongation is less than 100 GPa.

13. The tire according to claim 12, wherein the secant modulus of the reinforcement elements at 0.7% elongation is greater than 20 GPa.

14. The tire according to claim 12, wherein the secant modulus of the reinforcement elements at 0.7% elongation is between 30 and 90 GPa.

15. The tire according to claim 11, wherein a maximum tangent modulus of the reinforcement elements is less than 130 GPa.

16. The tire according to claim 15, wherein a maximum tangent modulus of the reinforcement elements is less than 120 GPa.

17. The tire according to claim 1, wherein the reinforcement elements of said layer of circumferential reinforcement elements are metallic reinforcement elements having a curve of tensile stress as a function of a relative elongation having shallow gradients for low elongations and a substantially constant, steep gradient for the higher elongations.

18. The tire according to claim 1, wherein the reinforcement elements of the at least one layer of circumferential reinforcement elements are metallic reinforcement elements cut so as to form sections of a length less than a circumference of a least long ply, but greater than 0.1 times said circumference, the cuts between sections being axially offset from each other.

19. The tire according to claim 18, wherein a modulus of elasticity in tension per unit of a width of the at least one layer of circumferential reinforcement elements is less than a modulus of elasticity in tension, measured under the same conditions, of the most extensible working crown layer.

20. The tire according to claim 1, wherein the reinforcement elements of the at least one layer of circumferential reinforcement elements are undulating metallic reinforcement elements, a ratio $a/\lambda$ of an amplitude of undulation a to a wavelength $\lambda$ being at most equal to 0.09.

21. The tire according to claim 20, wherein a modulus of elasticity in tension per unit of width of the at least one layer of circumferential reinforcement elements is less than a modulus of elasticity in tension, measured under the same conditions, of the most extensible working crown layer.

22. The tire according to claim 1, wherein an angle formed with the circumferential direction by the reinforcement elements of the working crown layers is less than 30°.

23. The tire according to claim 1, wherein the working crown layers comprise reinforcement elements, crossed from one ply to the other, forming with the circumferential direction angles which are variable in an axial direction.

24. The tire according to claim 1, wherein the crown reinforcement is finished off radially to an outside by at least one supplementary layer of elastic reinforcement elements, which are oriented relative to the circumferential direction at an angle of between 10° and 45° and of the same direction as an angle formed by the inextensible elements of an adjacent one of the working crown layers.

25. The tire according to claim 1, wherein the crown reinforcement furthermore comprises a triangulation layer formed of metallic reinforcement elements forming angles greater than 60° with the circumferential direction.

26. The tire according to claim 1, wherein the ratio of a thickness of the crown block at one shoulder end to a thickness of the crown block in the circumferential median plane is less than 1.10.

27. The tire according to claim 1, wherein the ratio of the axial width of the tread to a maximum axial width of the tire is greater than or equal to 0.82.

28. The tire according to claim 1, wherein a distance between an end of an axially widest working crown layer of the at least two working crown layers and the carcass reinforcement is between 5 and 7 mm.

29. The tire according to claim 1, wherein axial widths of the at least two working crown layers are smaller than the axial width of the tread.

30. The tire according to claim 1, wherein the aspect ratio H/S strictly greater than 0.55 and less than 0.60.

31. A tire having an aspect ratio H/S strictly greater than 0.55 and less than 0.75, said tire having a radial carcass reinforcement comprising a crown reinforcement formed of at least two working crown layers of inextensible reinforcement elements, crossed from one ply to another forming angles of between 10 and 45 with a circumferential direction, said crown reinforcement being topped radially by a tread, said tread being joined to two beads by means of two sidewalls, the crown reinforcement comprising at least one layer of circumferential reinforcement elements, wherein the ratio of a thickness of a crown block at one shoulder end to a thickness of the crown block in a circumferential median plane is less than 1.20 and greater than 1;

wherein the thickness of a crown block at one shoulder end is defined by a length of an orthogonal projection of the shoulder end on a radially innermost layer of rubber mix of the tire from the shoulder end on the outer surface of the tire to the radially innermost layer of rubber mix; and wherein the shoulder end is defined, in a zone of the shoulder of the tire, by the orthogonal projection orthogonal to an outer surface of the tire of an intersection of tangents to surfaces of an axially outer end of the tread and of a radially outer end of a sidewall, wherein the ratio of the axial width of the at least one layer of circumferential reinforcement elements to the axial width of the tread is greater than 0.65, and wherein a distance between an end of an axially widest working crown layer and the carcass reinforcement is between 2 and 15 mm, wherein a ratio of the axial width of the tread to a maximum axial width of the tire is greater than or equal to 0.80.

32. The tire according to claim 31, wherein the distance between the end of the axially widest working crown layer and the carcass reinforcement is between 5 and 7 mm.

33. The tire according to claim 31, wherein the aspect ratio H/S strictly greater than 0.55 and less than 0.60.

* * * * *